(12) United States Patent
Striessnig

(10) Patent No.: US 10,611,186 B2
(45) Date of Patent: Apr. 7, 2020

(54) ADHESIVE EDGING STRING

(71) Applicant: Strimac Holding Corp., Kanata (CA)

(72) Inventor: Benjamin S. Striessnig, Ottawa (CA)

(73) Assignee: Strimac Holding Corp., Kanata (CA)

( * ) Notice: Subject to any disclaimer, the term of this patent is extended or adjusted under 35 U.S.C. 154(b) by 216 days.

(21) Appl. No.: 15/956,808

(22) Filed: Apr. 19, 2018

(65) Prior Publication Data
US 2018/0304674 A1 Oct. 25, 2018

Related U.S. Application Data

(60) Provisional application No. 62/487,518, filed on Apr. 20, 2017.

(51) Int. Cl.
| | | |
|---|---|---|
| *B44D 3/22* | (2006.01) | |
| *B44D 3/00* | (2006.01) | |
| *C09J 7/38* | (2018.01) | |
| *B05B 12/24* | (2018.01) | |

(52) U.S. Cl.
CPC .............. *B44D 3/225* (2013.01); *B05B 12/24* (2018.02); *B44D 3/00* (2013.01); *C09J 7/38* (2018.01); *C09J 2203/31* (2013.01)

(58) Field of Classification Search
CPC ....................................................... B44D 3/255
USPC ..................................................... 33/413, 414
See application file for complete search history.

(56) References Cited

U.S. PATENT DOCUMENTS

| | | | |
|---|---|---|---|
| 4,149,320 A * | 4/1979 | Troyer ................. | G01B 3/1002 33/758 |
| 5,516,581 A | 5/1996 | Kreckel et al. | |
| 6,828,008 B2 | 12/2004 | Gruber | |
| 8,029,895 B1 | 10/2011 | Heysek | |
| 9,273,232 B2 | 3/2016 | Tynan, Jr. et al. | |
| 2007/0240320 A1* | 10/2007 | Hickey ..................... | B44D 3/38 33/414 |
| 2009/0202773 A1 | 8/2009 | Burgoon | |
| 2010/0011599 A1* | 1/2010 | Johnson ................... | B44D 3/38 33/414 |
| 2010/0059162 A1* | 3/2010 | Flanigan ................. | B44D 3/225 156/60 |
| 2011/0041983 A1* | 2/2011 | Menendez ............... | B44D 3/00 156/71 |
| 2013/0019487 A1* | 1/2013 | Fritsch ...................... | B44D 3/38 33/414 |
| 2016/0052332 A1* | 2/2016 | Deleo ....................... | B44D 3/38 33/414 |

* cited by examiner

*Primary Examiner* — George B Bennett
(74) *Attorney, Agent, or Firm* — Perkins IP Law Group LLC; Jefferson Perkins

(57) ABSTRACT

A flexible painter's string with pressure sensitive adhesive is provided. The painter's string provides edging for non-linear surfaces and provides a three-dimensional painting guide.

10 Claims, 1 Drawing Sheet

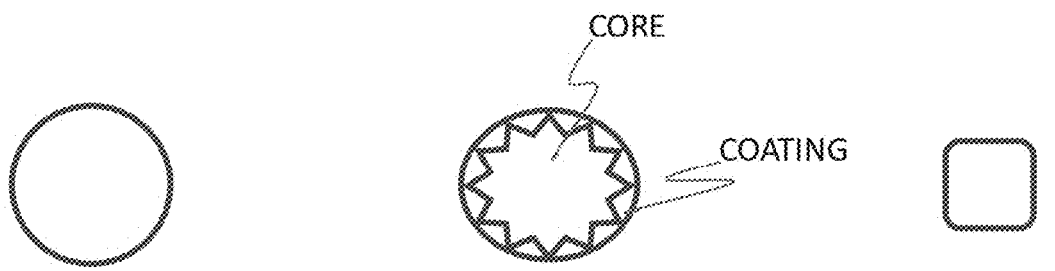
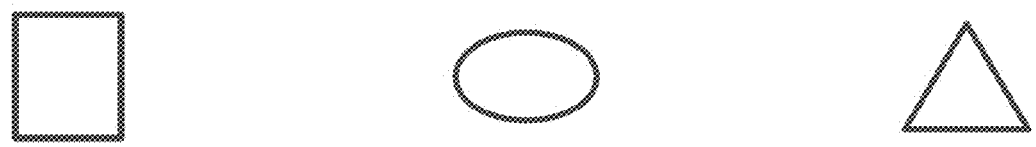

ADHESIVE EDGING STRING

FIELD OF THE INVENTION

This invention relates generally to painting tools and in particular to a barrier edge. Specifically, the invention relates to an adhesive edging string.

BACKGROUND OF THE INVENTION

Masking tape or painter's tape is often used to mask surfaces that are not to be painted or are to be painted a different colour. Masking tape when used properly reduces paint bleed, provides sharp, clear paint line, protects trim and fixtures and minimizes paint drips and splatter.

There are a variety of types of painter's tape available including the basic painter's tape for indoor surfaces, painter's tape of a variety of different textured surfaces, painter's tape for freshly painted surfaces. Painter's tape and edging tools that currently exist are designed to be used on substantially straight and smooth surfaces. Painter's tape and edging tools can be challenging to use in and/or around corners, and for non-straight lines including around curved or arched shapes. Moreover, painter's tape and edging tools are not amendable to uneven surfaces and non-linear edges.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide adhesive edging string. In accordance with an aspect of the present invention, there is provided a painter's string comprising a string having a pressure-sensitive adhesive applied to at least a portion thereof; wherein the string can be reversibly attached to a surface.

BRIEF DESCRIPTION OF THE DRAWINGS

These and other features of the invention will become more apparent in the following detailed description in which reference is made to the appended FIGURE.

FIG. 1 is a schematic of potential cross-sectional profiles of the painter's string.

DETAILED DESCRIPTION OF THE INVENTION

The painter's string of this invention comprises a three-dimensional flexible string or filament, either coated or uncoated, with a substantially smooth profile having a pressure-sensitive adhesive applied to at least a portion of the string. The string is designed be flexible and to facilitate the masking of corners, uneven surfaces, non-linear edges or around shapes. For example, the painter's string unlike traditional tape could readily be used to mask the edge of a circular window or arched or curved window or the like or in and/or around corners. The three-dimensional profile of the painter's string unlike painter's tape also provides an edge or a guide for the brush or applicator.

The string may be wound upon itself to form a roll or ball or may be provided in an applicator, housing or dispenser to facilitate application.

Optionally, the painter's string may include a removable backing or liner to protect the adhesive.

The painter's string can have a variety of cross-sectional profiles including substantially circular, oval, dome, square, rhomboid, parallelogram, or rectangular. Optionally, the portion of the string to which the pressure-sensitive adhesive is applied is flattened.

The painter's string is flexible and may be fabricated from appropriate materials known in the art including plastic, silicone, polymer, vinyl, polypropylene, nylon, cotton, etc. The painter's string may be coated to provide specific properties. In some embodiments, the painter's string is a multi-filament construction that is optionally coated.

In some embodiments, the painter's string comprises foam string or cord, optionally manufactured from silicone. Painter's string comprising foam string or cord may be coated. Optionally, the string includes at least a moldable section amendable for use on textured surfaces Optionally, the painter's string may be manufactured by methods known in the art including braiding, twisting or extrusion. In some embodiments, where a twisted or braided string is used as the core of the painter's string a coating may be used to smooth out the profile of the painter's string. In some embodiments, where a twisted or braided string is used as the core, the adhesive is applied to the grooves in the string thereby providing a substantially smooth profile.

The string may be a variety of thickness including 2 mm, 3 mm, 4 mm, 5 mm etc. In some embodiments, the thickness is small enough to allow for application in corners instead of against corners.

The pressure-sensitive adhesive may be applied to the whole surface of the string to facilitate application or may be applied to in one or more strips along the length of the string depending on application and other coatings used on the string. In some embodiments, the string may be saturated with adhesive.

In some embodiments, the adhesive may be configured to spread during application of the painter's string to the surface.

Appropriate pressure-sensitive adhesives are known in the art and include random copolymer adhesives including those based upon acrylate and/or methacrylate copolymers, α-olefin copolymers, silicone copolymers, chloroprene/acrylonitrile copolymers, and the like; block copolymer adhesives including those based upon linear block copolymers (i.e., A-B and A-B-A type), star block copolymers, comb block copolymers, and the like and natural rubber adhesives.

The adhesive compounds, solutions, or emulsions may be used, either alone or in combination, without departing from the scope of this invention. Rubber based adhesives such as, but not limited to, natural rubber, synthetic polyisoprene, styrene-isoprene-styrene block copolymer (SIS), styrene-butadiene-styrene block copolymer (SBS), styrene-ethylene-butylene-styrene block co-polymer (SEBS), styrene-ethylene-propylene-styrene block copolymer (SEPS), styrene butadiene rubber, nitrile rubber, neoprene rubber, butyral and butyl rubber, polyisobutylene, polysulfide rubber, silicone rubber, natural latex rubber, and synthetic latex rubber. Resin-based adhesives such as, but not limited to, polyvinyl acetate, polyvinyl butyral, polyvinyl chloride, acrylic, ethylene vinyl acetate, polyethylene-based, polyolefin based, nylon-based, phenol-based (including formaldehyde-based), urea-based (including formaldehyde-based), epoxy resin, polyurethane-based, rosin-based (including rosin esters), polyterpene-based, polyester, petroleum based, and low molecular weight-based adhesives. Inorganic adhesives such as, but not limited to, silicate adhesive and wax adhesives such as, but not limited to, paraffin, natural wax and bees wax.

Commercially available pressure-sensitive adhesives are also useful in the invention. Examples of these adhesives include, but are not limited to, Avery Dennisons' acrylic adhesive line (including, but not limited to, S8750, S8755 and S8840), Ashland's acrylic adhesive line (including, but not limited to, Aroset 320M, Aroset 1860 & Aroset 1930), Rohm & Haas's acrylic line (including, but not limited to Morstik 610, Morstik 650 & Morstik 837) and Cytec's acrylic adhesive line (including, but not limited to, GMS 4020 & GMS 2953).

The string may be configured to prevent seepage of liquid, including paint, to the underlying surface. For example, the string may further include an absorbent coating on at least a portion of the string not having the adhesive. The absorbent coating may prevent seepage of liquid, including paint, to the underlying surface.

Appropriate absorbent coatings are known in the art and include super-absorbent polymers known in the art. The super-absorbent coating is optionally specifically selected to absorb latex paint, oil-based paint, water-based paint, stains, glazes, lacquers or combination thereof.

In embodiments with an absorbent coating, the absorbent coating is applied to the painter string. As is known in the art, the absorbent coating may be formulated to retard curing of the paint and thereby facilitate release of the painter's string from the surface to which it has been applied. Accordingly, the absorbent coating may be applied to the full surface of the string prior to application of the adhesive, to a portion of the string not covered by the adhesive or to one or more edges or sides or arcs of the string.

In some embodiments, the painter's string has an absorbent core so that any paint that is on it gets trapped inside the string.

In some embodiments, the painter's string comprises a coating that facilitates release of the string after the painting is complete. Optionally, the coating retards paint drying or curing on the surface of the painter's string.

The painter's string can be sold in a kit with one or more other painting tools including painter's tape, applicators including brushes including foam and bristle brushes and rollers.

Although the invention has been described with reference to certain specific embodiments, various modifications thereof will be apparent to those skilled in the art without departing from the spirit and scope of the invention. All such modifications as would be apparent to one skilled in the art are intended to be included within the scope of the following claims.

I claim:

1. A painter's string comprising a string having a pressure-sensitive adhesive applied to at least a portion thereof; wherein the string can be reversibly attached to a surface.

2. The painter's string of claim 1, wherein the string is completely coated with the pressure-sensitive adhesive.

3. The painter's string of claim 1, wherein the string is coated with a non-porous barrier.

4. The painter's string of claim 1 or 2, wherein the string is pressure-sensitive adhesive is on top of a non-porous barrier.

5. The painter's string of claim 1 or 2, wherein the string is coated with an absorbent coating that prevents seepage to surface to which it is applied.

6. The painter's string of claim 1 or 2, wherein the string has a substantially circular or rounded cross section.

7. The painter's string of claim 1 or 2, wherein the string has a substantially square shape cross section.

8. The painter's string of claim 1 or 2, wherein the string has a substantially triangular cross section.

9. The painter's string of claim 1 or 2, wherein the painter string has a tensile strength that allows the painter's string to be torn.

10. A painter's string applicator comprising: a case with string guide and a supply reel with the painter's string of claim 1 or 2.

* * * * *